US012553364B2

(12) United States Patent
Warren et al.

(10) Patent No.: US 12,553,364 B2
(45) Date of Patent: Feb. 17, 2026

(54) MAGNET ANTI-ICE SYSTEM

(71) Applicant: United Technologies Corporation, Farmington, CT (US)

(72) Inventors: Eli C. Warren, Wethersfield, CT (US); Peter J. Walsh, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 1444 days.

(21) Appl. No.: 16/430,872

(22) Filed: Jun. 4, 2019

(65) Prior Publication Data

US 2020/0386118 A1 Dec. 10, 2020

(51) Int. Cl.
| F01D 25/02 | (2006.01) |
| F02C 7/047 | (2006.01) |
| F02K 3/06 | (2006.01) |
| H01F 7/20 | (2006.01) |
| H01F 27/24 | (2006.01) |
| H01F 27/28 | (2006.01) |

(52) U.S. Cl.
CPC .............. *F01D 25/02* (2013.01); *F02C 7/047* (2013.01); *F02K 3/06* (2013.01); *H01F 7/20* (2013.01); *H01F 27/24* (2013.01); *H01F 27/28* (2013.01)

(58) Field of Classification Search
CPC . F01D 25/02; F02C 7/047; B64D 2013/0607; B64D 2013/0666; B64D 15/00–22; F05D 2220/36; F02K 3/06; H01F 27/28; H01F 27/24
See application file for complete search history.

(56) References Cited

U.S. PATENT DOCUMENTS

| 2,701,092 | A |   | 2/1955 | Henshaw |  |
| 2,853,638 | A | * | 9/1958 | Bonnano | H02K 19/24 |
|           |   |   |        |         | 415/121.2 |
| 5,490,759 | A | * | 2/1996 | Hoffman | F01D 5/26 |
|           |   |   |        |         | 415/10 |
| 6,137,390 | A | * | 10/2000 | Tung | H01F 27/022 |
|           |   |   |        |         | 336/84 R |
| 8,225,593 | B2 | * | 7/2012 | Le Hong | F01D 25/18 |
|           |   |   |        |         | 60/268 |
| 9,140,187 | B2 |   | 9/2015 | Ribarov et al. |  |

(Continued)

FOREIGN PATENT DOCUMENTS

| DE | 426057 | 3/1926 |
| DE | 4041962 A1 | 6/1992 |

(Continued)

OTHER PUBLICATIONS

Jason Thompson, Four Factors Affecting Electromagnets, Apr. 16, 2018 (Year: 2018).*

(Continued)

*Primary Examiner* — Devon C Kramer
*Assistant Examiner* — Jingchen Liu
(74) *Attorney, Agent, or Firm* — Getz Balich LLC

(57) ABSTRACT

A magnet for an anti-ice system includes a core and at least one coil wound about a perimeter of the core. The core includes a first material having a first epoxy composition. The at least one coil includes a second material having a second epoxy composition. The first epoxy composition and the second epoxy composition each include a bisphenolic resin composition including bisphenol AF and at least one of a filler or a conductivity modifier.

18 Claims, 8 Drawing Sheets

(56) References Cited

U.S. PATENT DOCUMENTS

| | | | |
|---|---|---|---|
| 9,469,408 B1* | 10/2016 | Elangovan | B64D 33/02 |
| 2008/0166563 A1 | 7/2008 | Brittingham | |
| 2015/0206646 A1* | 7/2015 | Dinh | H01F 17/045 |
| | | | 336/188 |
| 2016/0069214 A1* | 3/2016 | Engebretsen | F01D 21/045 |
| | | | 415/196 |
| 2016/0108754 A1 | 4/2016 | Herbaut et al. | |
| 2017/0314567 A1* | 11/2017 | Hansen | F04D 29/325 |

FOREIGN PATENT DOCUMENTS

| | | | | |
|---|---|---|---|---|
| GB | 629764 | * | 9/1947 | F02C 7/047 |
| GB | 629764 A | | 9/1949 | |
| GB | 689901 A | | 4/1953 | |
| WO | WO-2015049993 A1 | * | 4/2015 | B22F 1/0011 |

OTHER PUBLICATIONS

Prathamesh Muley, Ice Accretion in Aircraft Engines, Dec. 2015, International Journal of Scientific & Engineering Research, vol. 6, Issue 12, (Year: 2015).*

American Chemistry Council, About BPA: Epoxy Resins (Year: 2016).*

EP search report for EP20178161.4 dated Aug. 24, 2020.

* cited by examiner

MAGNET ANTI-ICE SYSTEM

BACKGROUND

1. Technical Field

This disclosure relates generally to anti-ice systems for aircraft structures, and more particularly, to magnet anti-ice systems for gas turbine engine fan blades.

2. Background Information

During certain atmospheric conditions, fan blades in gas turbine engines can collect ice causing unwanted vibrations and/or a loss of effective blade-tip sealing. Ice accumulation is conventionally addressed by directing heated air (e.g., compressor bleed air) from the nose cone towards the fan blades to heat the surfaces of the fan blades. However, while this method may be somewhat effective at preventing or removing ice formation near the roots of the fan blades, it is not effective at preventing or removing ice formation near the tips of the fan blades. Loss of effective blade-tip sealing as a result of ice accumulation has been addressed by adjusting fan blade-tip clearances, however, opening of blade-tip clearances can result in a loss of gas turbine engine efficiency and/or a reduction in gas turbine engine stall margin.

The above-noted problems have been addressed by including magnets within the outer air seal to induce eddy currents in the passing blades, thereby locally heating the blade tips. However, integrating these magnets into modern fan liners may be impractical without adversely affecting the thermal and/or mechanical performance of the fan system. Accordingly, an anti-ice system for addressing one or more of the above-described concerns would find utility.

SUMMARY

According to an embodiment of the present disclosure, a magnet for an anti-ice system includes a core and at least one coil wound about a perimeter of the core. The core includes a first material having a first epoxy composition. The at least one coil includes a second material having a second epoxy composition. The first epoxy composition and the second epoxy composition each include a bisphenolic resin composition including bisphenol AF and at least one of a filler or a conductivity modifier.

In the alternative or additionally thereto, in the foregoing embodiment, the first epoxy composition is a ferromagnetic epoxy composition.

In the alternative or additionally thereto, in the foregoing embodiment, the second epoxy composition is a conductive epoxy composition.

In the alternative or additionally thereto, in the foregoing embodiment, the at least one coil includes at least a first coil and a second coil. The first coil and the second coil are alternatingly wound about the perimeter of the core.

In the alternative or additionally thereto, in the foregoing embodiment, the perimeter of the core extends between a first core end and a second core end and the at least one coil is wound about the perimeter of the core from the first core end to the second core end.

In the alternative or additionally thereto, in the foregoing embodiment, the magnet is configured to emit a magnetic field in response to an electrical current applied to the at least one coil.

In the alternative or additionally thereto, in the foregoing embodiment, the first epoxy composition includes an iron filler.

According to another embodiment of the present disclosure, an anti-ice system includes a susceptor material and a magnet having a magnetic field encompassing at least a portion of the susceptor material. The magnet includes a core and at least one coil wound about a perimeter of the core. The core includes a first material having a first epoxy composition. The at least one coil includes a second material having a second epoxy composition. The first epoxy composition and the second epoxy composition each include a bisphenolic resin composition including bisphenol AF and at least one of a filler or a conductivity modifier.

In the alternative or additionally thereto, in the foregoing embodiment, the magnet is configured for inducing eddy currents in the susceptor material to increase a surface temperature of the susceptor.

In the alternative or additionally thereto, in the foregoing embodiment, the susceptor material is configured to rotate about an axis and the magnet is stationary with respect to the axis.

In the alternative or additionally thereto, in the foregoing embodiment, the susceptor material is radially disposed between the magnet and the axis.

According to another embodiment of the present disclosure, a fan assembly for a gas turbine engine includes a fan case annularly disposed about an axial centerline. A fan is radially disposed with the fan base. The fan includes a plurality of fan blades extending radially from a shaft configured to rotate about the axial centerline. At least one magnet is mounted within the fan case radially outward of the fan and configured for inducing eddy currents in the plurality of fan blades to increase a surface temperature of the plurality of fan blades. The at least one magnet includes a core and at least one coil wound about a perimeter of the core. The core includes a first material having a first epoxy composition. The at least one coil includes a second material having a second epoxy composition. The first epoxy composition and the second epoxy composition each include a bisphenolic resin composition including bisphenol AF and at least one of a filler or a conductivity modifier.

In the alternative or additionally thereto, in the foregoing embodiment, the fan case includes a plurality of liner segments mounted to an interior surface of the fan case and disposed radially outward of the fan.

In the alternative or additionally thereto, in the foregoing embodiment, the at least one magnet is disposed within at least one liner segment of the plurality of liner segments.

In the alternative or additionally thereto, in the foregoing embodiment, the plurality of liner segments is mounted to the interior surface of the fan case about a circumference of the interior surface.

In the alternative or additionally thereto, in the foregoing embodiment, the at least one magnet is configured to emit a magnetic field in response to an electrical current applied to the at least one coil.

In the alternative or additionally thereto, in the foregoing embodiment, the fan assembly further includes a power supply in communication with the at least one magnet and a controller in communication with the power supply. The controller selectively commands the electrical current supplied to the at least one magnet via the power supply in response to an input received by the controller.

In the alternative or additionally thereto, in the foregoing embodiment, the at least one magnet includes at least a first magnet and a second magnet. The first magnet and the second magnet are axially spaced from one another within the fan case.

In the alternative or additionally thereto, in the foregoing embodiment, the at least one magnet includes at least a first magnet and a second magnet. The first magnet and the second magnet are circumferentially spaced from one another within the fan case.

In the alternative or additionally thereto, in the foregoing embodiment, the first epoxy composition is a ferromagnetic epoxy composition and the second epoxy composition is a conductive epoxy composition.

The present disclosure, and all its aspects, embodiments and advantages associated therewith will become more readily apparent in view of the detailed description provided below, including the accompanying drawings.

DETAILED DESCRIPTION

Figure 1:
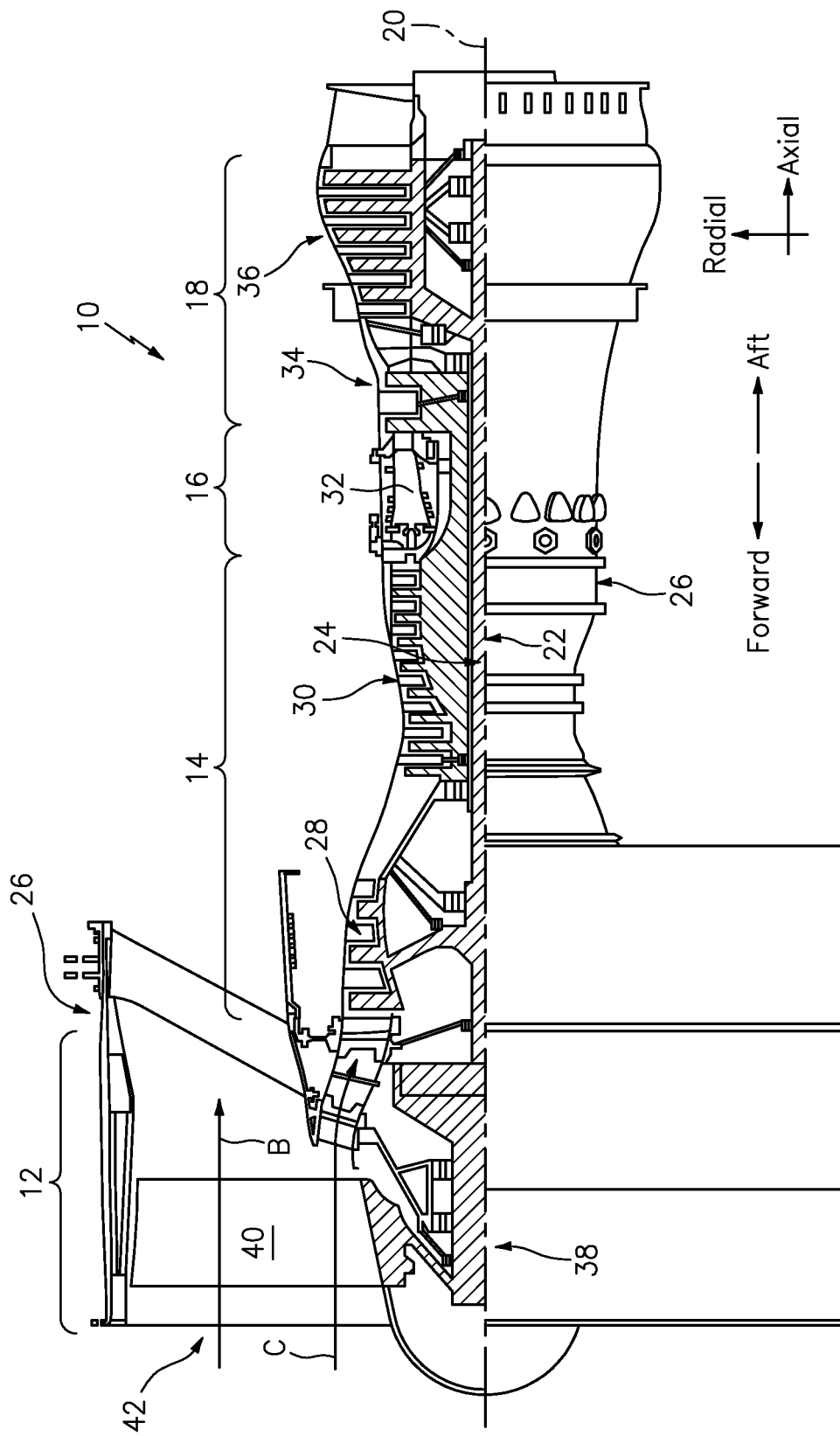
FIG. 1 illustrates a schematic view of a gas turbine engine.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Referring to FIG. 1 a gas turbine engine 10 generally includes a fan section 12, a compressor section 14, a combustor section 16, and a turbine section 18 disposed about an axial centerline 20. The fan section 12 receives air from an inlet 42 and drives a bypass airflow along a bypass flow path B, while the compressor section 14 drives a core airflow along a core flow path C for compression and communication into the combustor section 16 then expansion through the turbine section 18.

The gas turbine engine 10 includes a low-speed spool 22 and a high-speed spool 24 mounted for rotation about the axial centerline 20 relative to an engine static structure 26. The core airflow is compressed by a low-pressure compressor 28 then a high-pressure compressor 30, mixed and burned with fuel in the combustor 32, then expanded over the high-pressure turbine 34 and low-pressure turbine 36. The high-pressure and low-pressure turbines 34, 36 rotationally drive the respective high-speed spool 24 and low-speed spool 22 in response to the expansion. The low-speed spool 22 generally includes a fan shaft 38 from which extends a fan 40. The fan shaft 38 drives the fan 40 directly or indirectly (e.g., through a geared architecture to drive the fan 40 at a lower speed than the low-speed spool 22).

Figure 2:
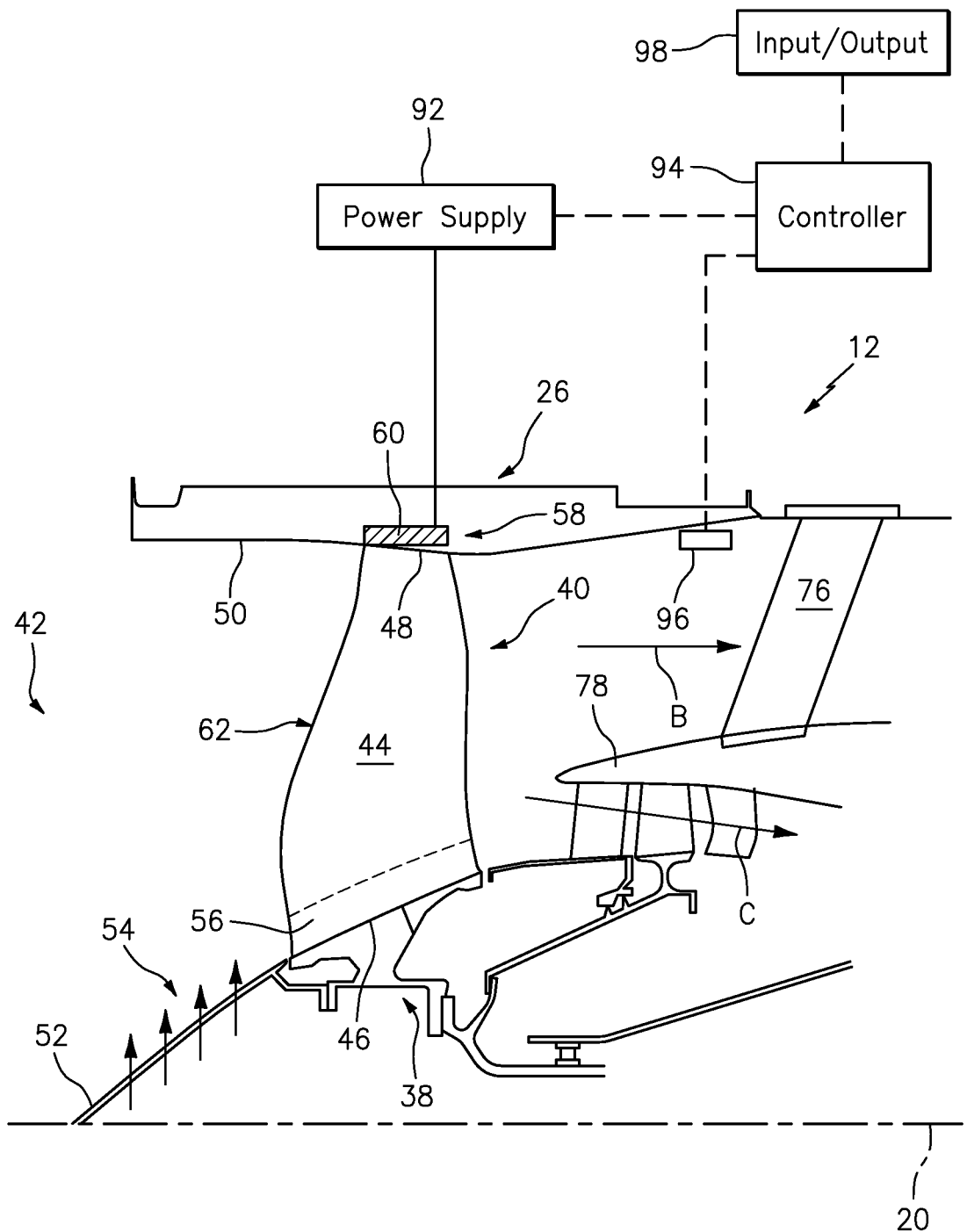
FIG. 2 illustrates a schematic view of a fan section of a gas turbine engine.

Referring to FIG. 2, the fan section 12 of the gas turbine engine 10 is shown. As discussed above, the fan 40 drives air into the bypass flow path B or towards the compressor section 14 via the core flow path C. One or more fan exit guide vanes 76 may be disposed in the bypass flow path B, for example, between the engine static structure 26 and a splitter 78. The fan 40 includes a plurality of fan blades 44 circumferentially spaced from one another about the fan 40. Each fan blade 44 extends radially from a root 46 to a tip 48. The tip 48 of each fan blade 44 is radially spaced (e.g., by a "blade-tip clearance") from a portion of the engine static structure 26, for example, a fan case 50. The fan case 50 forms an annular structure about the axial centerline 20 to radially house the fan 40. The fan section 12 may include a nose cone 52 connected to the fan shaft 38 for rotation with the fan 40.

In various embodiments, the nose cone 52 may be in fluid communication with the compressor section 14 of the gas turbine engine 10 for receiving heated warm air 54 (e.g., compressor bleed air). The warm air 54 may be expelled from the nose cone 52 for the purpose of removing ice and/or preventing the formation of ice on the nose cone 52 and/or the fan blades 44. Due to the air flowing into the inlet 42, the warm air 54 may tend to form a film along the surfaces of the nose cone 52 and a root portion 56 of the fan blades 44, thereby heating the surfaces of nose cone 52 and the root portion 56. In various embodiments, root portion 56 may be that portion of the fan blades 44 extending from the root 46 that is less than 25% of the total length of the fan blades 44, an in various embodiments that is less than 15% of the total length of the fan blades 44, and in various embodiments, that is less than 10% of the total length of the fan blades 44, wherein the total length of the fan blades 44 is the average radial distance between the roots 46 and the tips 48 of the respective fan blades 44. In various embodiments, warm air 54 may not be provided for removing or preventing the formation of ice on surfaces of the fan blades 44.

Because air entering the inlet 42 tends to force the warm air 54 from traveling radially outward towards the tips 48 of the fan blades 44, ice may tend to form on the fan blades 44 during icing conditions (e.g., depending on atmospheric conditions). Ice may tend to accumulate on the surfaces of the fan blades 44 towards leading edges 62 of the respective fan blades 44 between the tips 48 and the roots 46. Ice may tend to accumulate on the surfaces of the fan blades 44 radially outward from the root portion 56. In this regard, it may be desirable to provide additional heating to the surfaces of the fan blades 44 that are radially outward of the root portion 56.

Still referring to FIG. 2, an anti-ice system 58 is illustrated in accordance with various embodiments. The anti-ice system 58 may include one or more magnets 60 mounted to the engine static structure 26, for example, the fan case 50 as shown in FIG. 2. The one or more magnets 60 are configured to emit a magnetic field. The one or more magnets 60 may be disposed within the engine static structure 26 radially outward from the tips 48 of the fan blades 44. Accordingly, the one or more magnets 60 may be axially aligned with the fan blades 44. The fan blades 44 may rotate with respect to the one or more magnets 60 (e.g., about the axial centerline 20). As used herein, the term "anti-ice system" may refer to a system configured to prevent the formation of ice on surfaces of the fan blades 44 (i.e., an anti-ice system) and/or to an system configured to remove ice from surfaces of the fan blades 44 (i.e., a de-icing system).

In various embodiments, at least one of the one or more magnets 60 may be disposed at positions within the fan section 12 other than the engine static structure 26 and/or the fan case 50. For example, at least one of the one or more magnets 60 may be axially spaced from the fan 40 (e.g., mounted to the splitter 78) and/or disposed radially inward of the fan 40. In various embodiments, at least one of the one or more magnets 60 may be different than another at least one of the one or more magnets 60. For example, the magnets of the one or more magnets 60 may be permanent magnets, electromagnets, or have varying material compositions.

Figure 3:
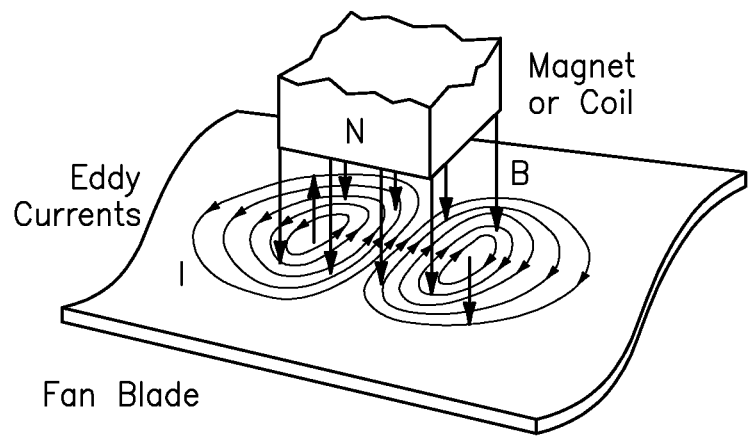
FIG. 3 illustrates a magnet generating eddy currents in a fan blade.

Referring momentarily to FIG. 3, eddy currents may be currents which circulate in conductors like swirling eddies in a stream. Eddy currents may be induced by changing magnetic fields and flow in closed loops, perpendicular to the plane of the magnetic field. Eddy currents may be created when by relative motion between a conductor and the magnetic field, i.e., anything which results in the conductor experiencing a change in the intensity or direction of a magnetic field can produce eddy currents. The size of the eddy currents may be proportional to the size of the magnetic field, the area of the closed loop, and the rate of change of magnetic flux, and inversely proportional to the electrical resistance of the conductor. The heating effect within the conductor originates from the transformation of electric energy into heat energy and may be referred to as induction heating. The electrical resistance experienced by the eddy currents in the conductor may cause induction heating in the conductor (e.g., all or a portion of the material of the fan blades 44) and the amount of heat generated may be proportional to the electrical current value of the eddy currents, squared.

In this regard, with reference again to FIG. 2, the one or more magnets 60 may be disposed in close proximity to the fan blades 44 such that the magnetic field of the one or more magnets 60 encompasses all or a portion of the fan blades 44 and induces eddy currents in the fan blades 44. The fan blades 44 may rotate through the magnetic field emitted by the one or more magnets 44 as the fan blades 44 rotate about the axial centerline 20. The one or more magnets 60 may be stationary with respect to the axial centerline 20. Accordingly, rotation of the fan blades 44 relative to the one or more magnets 60 may induce eddy currents within the material(s) of the fan blades 44.

Accordingly, a material of the fan blades 44 may be a susceptor material (e.g., a material used for its ability to absorb electromagnetic energy and convert it to heat) The susceptor material may include ferromagnetic and/or ferrimagnetic materials. The susceptor material may include a polymer and/or a composite material. In various embodiments, the entire material of the fan blades 44 may a susceptor material. In various other embodiments, the fan blades 44 may include a susceptor material coating on an exterior surface of the fan blades 44. While the susceptor material of the present disclosure is described with regard to the fan blades 44, it should be understood that other components having susceptor materials may also benefit from the anti-ice system described herein.

Figure 4A:
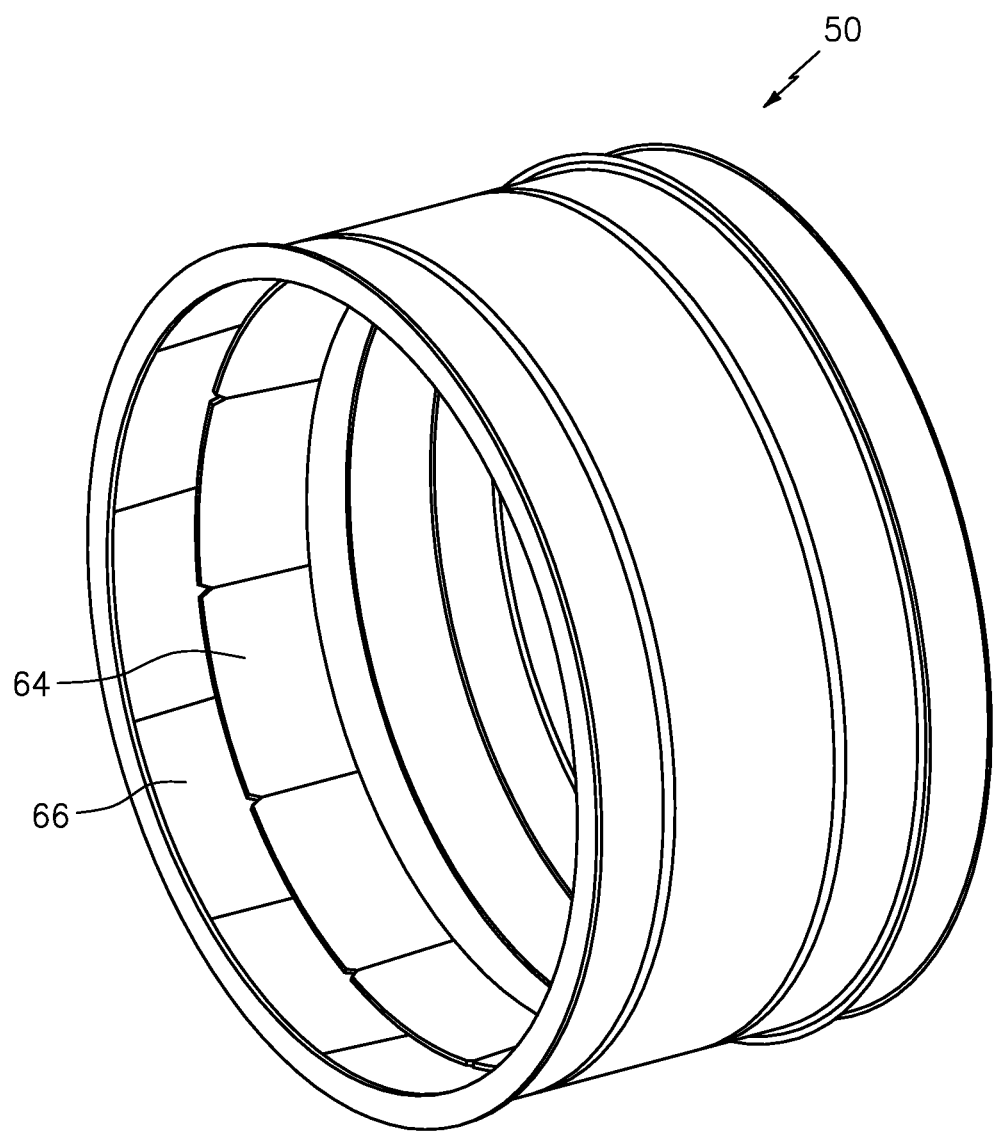
FIG. 4A illustrates a perspective view of an exemplary fan casing.
Figure 4B:
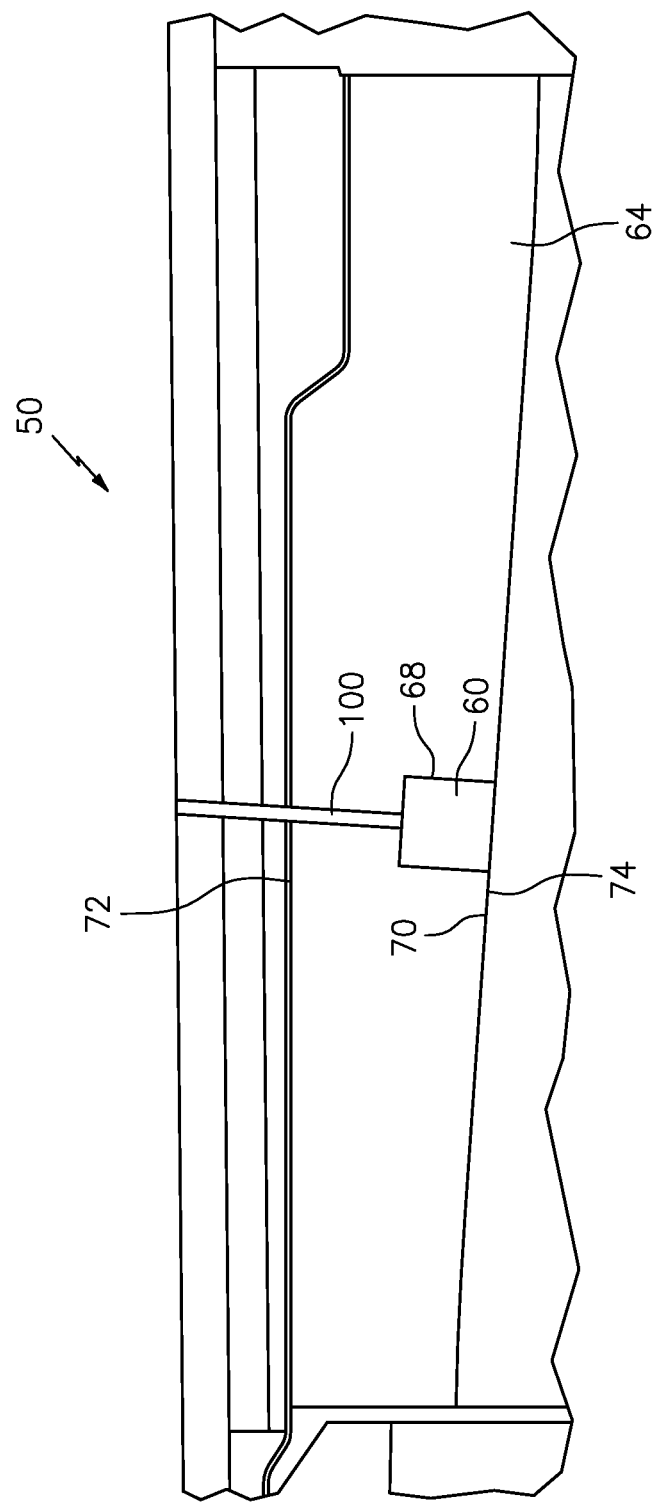
FIG. 4B illustrates a cross-sectional side view of a portion of the fan casing of FIG. 4A.

Referring to FIGS. 4A and 4B, in various embodiments, the fan case 50 may include one or more abradable liner segments 64 mounted to an interior surface 66 of the fan case 50. The one or more liner segments 64 may be disposed circumferentially about the interior surface 66 of the fan case, as shown in FIG. 4A for example. The one or more liner segments 64 may be disposed radially outward of and/or axially aligned with the fan blades 44 (see FIG. 2). The one or more magnets 60 may be mounted to at least one of the one or more liner segments 64. The one or more liner segments 64 may include a cavity 68 extending from an inner radial surface 70 of the one or more liner segments 64 towards an outer radial surface 72 of the one or more liner segments 64. The cavity 68 may extend a portion of the distance from the inner radial surface 70 to the outer radial surface 72. The one or more magnets 60 may be disposed within the cavity 68. The one or more magnets 60 may have an inner radial surface 74 which forms a substantially continuous surface with the inner radial surface 70 of the one or more liner segments 64 (i.e., the surfaces 70, 74 may be substantially co-planar). The fan case 50 and/or the one or more liner segments 64 may include passages 100 extending between the outer radial surface 72 and the cavity 68, for example, to permit the passage of electrical wires for providing electrical current to the one or more magnets 60.

Figure 5A:
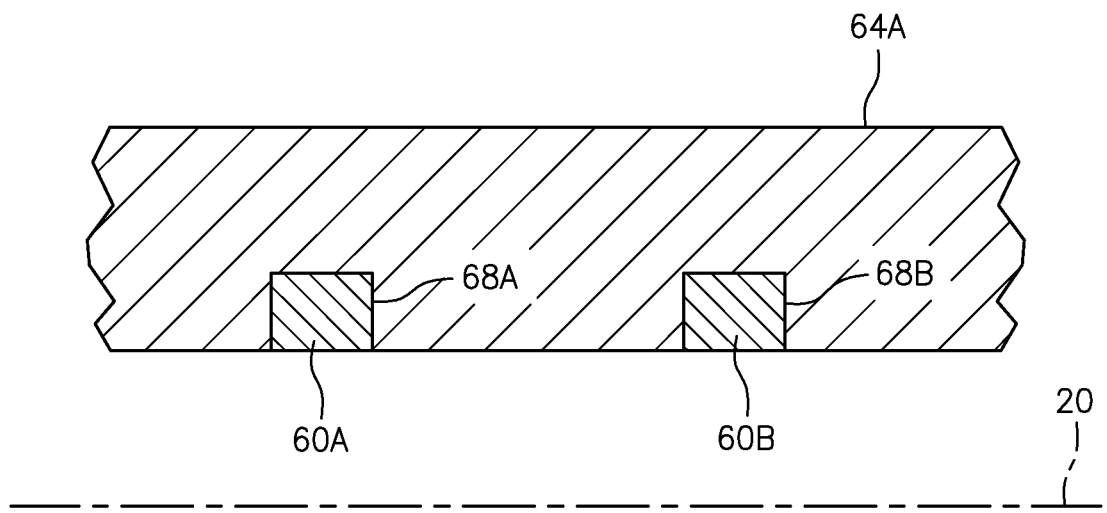
FIG. 5A illustrates a cross-sectional side view of an exemplary fan casing.
Figure 5B:
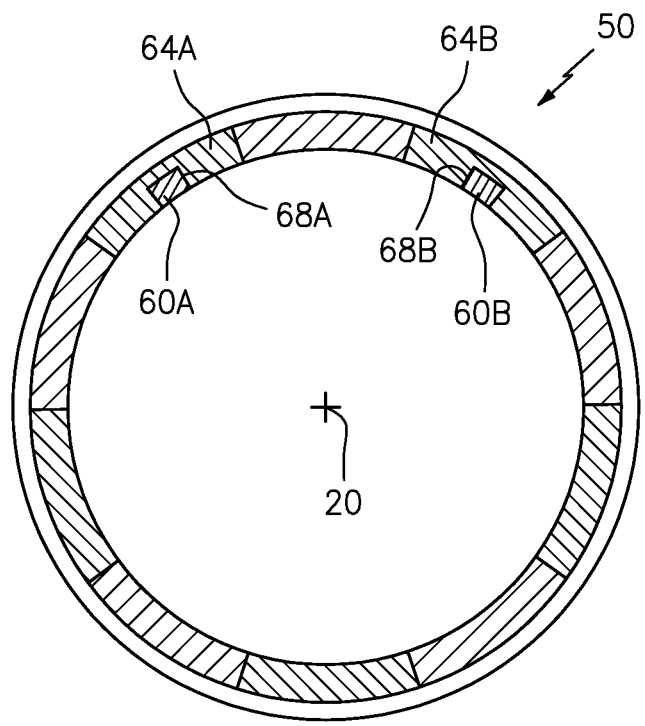
FIG. 5B illustrates a cross-sectional front view of an exemplary fan casing.

Referring to FIGS. 5A and 5B, in various embodiments, more than one of the one or more magnets 60 may be mounted to the fan case 50. More than one of the one or more magnets 60 may be mounted to a liner segment 64A of the one or more liner segments 64. For example, as shown in FIG. 5A, at least a first magnet 60A and a second magnet 60B of the one or more magnets 60 may be mounted to the liner segment 64A. The first magnet 60A and the second magnet 60B may be mounted within a respective first cavity 68A and second cavity 68B. The first magnet 60A and the second magnet 60B may be axially (as shown in FIG. 5A) or circumferentially spaced from one another. In various embodiments, more than one of the one or more liner segments 64 may house at least one magnet of the one or more magnets 60 (as shown in FIG. 5B). For example, a first liner segment 64A and a second liner segment 64B of the one or more liner segments 64 may house a respective first magnet 60A and a second magnet 60B of the one or more magnets 60. The first magnet 60A and the second magnet 60B may be mounted within a respective first cavity 68A and second cavity 68B of the respective first liner segment 64A and second liner segment 64B. The first magnet 60A and the second magnet 60B may be circumferentially spaced from one another.

Figure 6A:
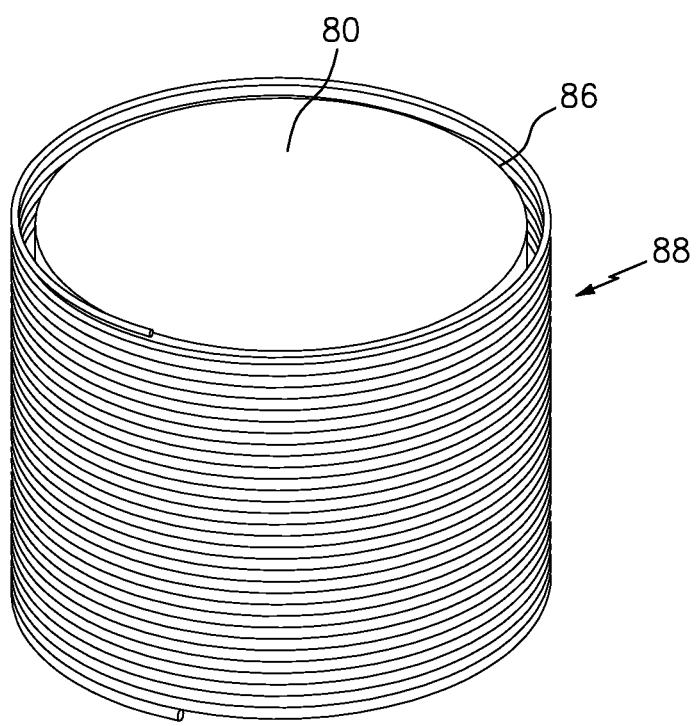
FIG. 6A illustrates perspective view of an exemplary magnet.
Figure 6B:
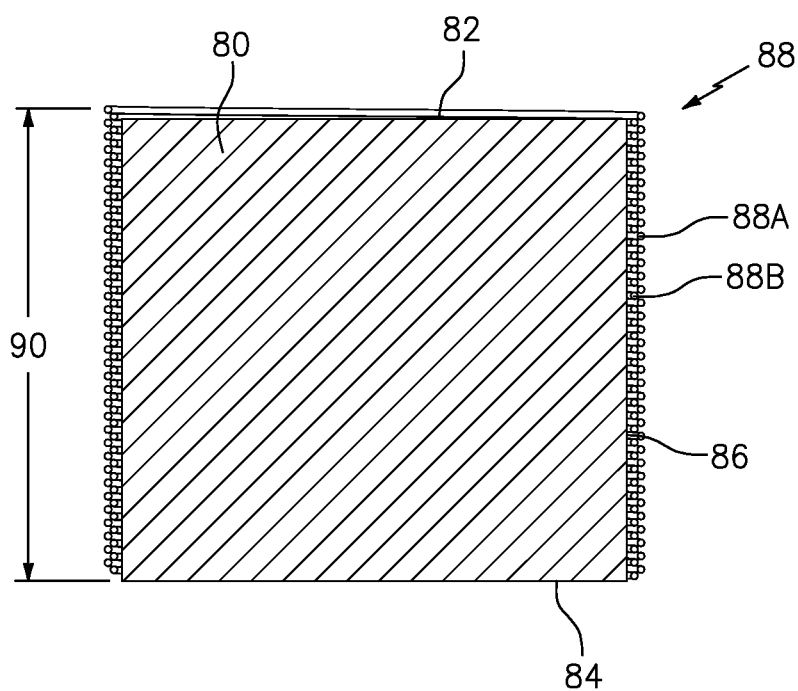
FIG. 6B illustrates a cross-sectional side view of the magnet of FIG. 6A.

Referring to FIGS. 6A and 6B, the one or more magnets 60 may include a core 80 extending between a first core end 82 and a second core end 84. The core 80 may define a perimeter 86 extending around the core 80 between the first core end 82 and the second core end 84. At least one coil 88 may be wound about the perimeter 86 of the coil 80. The at least one coil 88 may be wound about the perimeter 86 of the coil 80 along a length 90 of the coil 80 between the first coil end 82 and the second coil end 84. The at least one coil 88 may include at least a first coil 88A and a second coil 88B. The first and second coils 88A, 88B may be wound with one coil 88A, 88B on top of the other coil 88A, 88B with respect to the core 80, alternatingly wound about the perimeter 86 of the core 80, or combinations thereof along the length 90 of the core 80. The one or more magnets 60, as shown in FIGS. 6A and 6B, may be configured as an electromagnet. Accordingly, the one or more magnets 60 may be configured to emit a magnetic field in response to an electrical current applied to the at least one coil 88. The core 80 may include a ferromagnetic material (e.g., iron) in order to increase the strength of the magnetic field emitted by the one or more magnets 60. In various embodiments, the one or more magnets 60 may not include a core 80.

In various embodiments, the at least one coil 88 may be configured as an insulated wire. Accordingly, the at least one coil 88 may include a conductive material surrounding by a non-conductive material such as an electrical insulator (i.e., a material having a high electrical resistance). As will be discussed in further detail below, in various embodiments, the core 80 may include a ferromagnetic material having a first epoxy composition. The at least one coil 88 may include a conductive material having a second epoxy composition which may be different than the first epoxy composition. The at least one coil 88 may also include a non-conductive material having a third epoxy composition which forms the outer insulation of the at least one coil 88. The third epoxy composition of the non-conductive material may be different than one or both of the first and second epoxy compositions of the ferromagnetic material and the conductive material, respectively. One or both of the first epoxy composition and the second epoxy composition may include one or more conductivity modifiers in order to increase the electrical conductivity of the respective epoxy composition. One or more of the first epoxy composition, the second epoxy composition, and the third epoxy composition may include one or more fillers. For example, the first epoxy composition may include a ferromagnetic filler (e.g., iron or iron oxides) in order to give the first epoxy composition magnetic qualities. In various embodiments, one or more of the first epoxy composition, the second epoxy composition, and the third epoxy composition may have hydrophobic properties. In various embodiments, one or more of the first epoxy composition, the second epoxy composition, and the third epoxy composition may have mechanical properties such as, for example, strength, viscosity, thermal endurance, hardness, abrasion resistance, and density, substantially similar to the material of the one or more liner segments 64.

In various embodiments, one or more of the conductive material, the non-conductive material, and the ferromagnetic material may include a bisphenolic resin epoxy composition including bisphenol AF resin (DIAGRAM 1 below) and at least one of bisphenol A resin and/or bisphenol F resin. In various embodiments, the bisphenolic resin composition may include a mixture of bisphenol AF with bisphenol A at a mixture ratio of about 10% to about 90% or about 90% to about 10%. In various embodiments, the mixture ratio of bisphenol AF with bisphenol A may be between about 20% to about 80% and about 80% to about 20%, or between about 30% to about 70% and about 70% to about 30%, or between about 40% to about 60% and about 60% to about 40%, or between about 50% to about 50%. In various embodiments, the bisphenolic resin composition may include a mixture of bisphenol AF with bisphenol F at a mixture ratio of about 10% to about 90% or about 90% to about 10%. In various embodiments, the mixture ratio of bisphenol AF with bisphenol F may be between about 20% to about 80% and about 80% to about 20%, or between about 30% to about 70% and about 70% to about 30%, or between about 40% to about 60% and about 60% to about 40%, or between about 50% to about 50%. In various embodiments, the bisphenolic resin composition may include a mixture of bisphenol AF with bisphenol A and bisphenol F at a mixture ratio of about 5% to about 90% and about 1% to about 94% and about 1% to about 94% or about 90% to about 5% and about 94% to about 1% and about 94% to about 1%. In various embodiments, the mixture ratio of bisphenol AF with bisphenol A and bisphenol F may be between about 10% to about 80% and about 10% to about 80% and about 80% to about 10% and about 80% to about 10% and about 80% to about 10% and about 80% to about 10%, or between about 20% to about 60% and about 20% to about 60% and about 20% to about 60% and about 60% to about 20% and about 60% to about 20% and about 60% to about 20%, or between about 30% to about 40% and about 30% to about 40% and about 30% to about 40% and about 40% to about 30% and about 40% to about 30% and about 40% to about 30%. In various embodiments, the bisphenolic resin composition may include between 15% and 25% by weight of bisphenol A diglycidyl ether and/or bisphenol F, between 10% and 20% by weight of Alkyl(C12-14) glycidyl ether, and between 65% and 70% of bisphenol AF.

Diagram 1

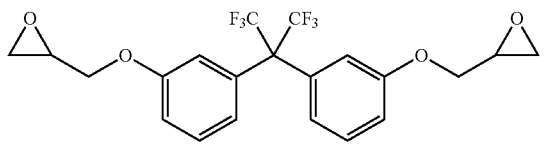 [SMILES: FC(F)(F)C(c1cccc(OCC2CO2)c1)(c1cccc(OCC2CO2)c1)C(F)(F)F]

In various embodiments, the bisphenolic resin composition may be represented by a formula:

$$100 - wt\ \%\ AF = wt\ \%\ A + wt\ \%\ B + wt\ \%\ E + wt\ \%\ F + wt\ \%\ M + wt\ \%\ Br4A + wt\ \%\ BrNPGDGE$$

In Formula 1, wt % indicates the corresponding quantity is a weight percent relative to the total weight of all other bisphenolic resin components; AF represents bisphenol AF, A represents bisphenol A, B represents bisphenol B, E represents bisphenol E, F represents bisphenol F, M represents bisphenol M, Br4A represents tetrabromobisphenol A, and BrNPGDE represents brominated neopentyl glycol diglycidyl ether; wt % AF is a number in the range from about 10 to about 90, wt % A is a number in the range from 0 to about 90, wt % B is a number in the range from 0 to about 90, wt % E is a number in the range from 0 to about 90, wt % F is a number in the range from 0 to about 90, wt % M is a number in the range from 0 to about 90, wt % Br4A is a number in the range from 0 to about 30, and wt % BrNPGDE is a number in the range from about 10 to about 30. In various embodiments, at least one of bisphenol A, bisphenol B, bisphenol E, bisphenol F, bisphenol M, tetrabromobisphenol A, and brominated neopentyl glycol diglycidyl ether are combined with bisphenol AF in Formula 1. In various embodiments, Formula 1 describes a bisphenolic resin combination, by weight percent of components including bisphenol AF, brominated neopentyl glycol diglycidyl ether, and at least one of bisphenol A, bisphenol B, bisphenol E, bisphenol F, bisphenol M, or tetrabromobisphenol A. In various embodiments, a bisphenolic resin combination of Formula 1 may include one or more or all of bisphenol A, bisphenol B, bisphenol E, bisphenol F, bisphenol M, and tetrabromobisphenol A.

In various embodiments, the epoxy composition of the conductive material may include a conductivity modifier which may include at least one of carbon black, graphite flakes, nano powders including one of silver, nickel, copper, or aluminum, micro powders including one of silver, nickel, copper, or aluminum, or whiskers including one of silver, nickel, copper, or aluminum. In various embodiments, a mixture of conductivity modifier and a bisphenolic resin composition includes from 0 to 50 weight percent of the conductivity modifier to the bisphenolic resin composition. In various embodiments, a mixture of conductivity modifier and a bisphenolic resin composition includes between 1 and 50 weight percent of the conductivity modifier, or between 5 and 45 weight percent of the conductivity modifier, or between 10 and 40 weight percent of the conductivity modifier, or between 20 and 30 weight percent of the conductivity modifier. In various embodiments, the conductive material has an electrical resistivity not more than $10^{-7}$ Ohm-meter (Ohm-m). In various embodiments, the conductive material may have a porosity (% of water absorption at room temperature) of zero.

In various embodiments, the material of the core 80 (e.g., the ferromagnetic material) may be a ferromagnetic or ferrimagnetic epoxy composition. The epoxy composition of the core 80 material may include one or more fillers, for example, ferromagnetic or ferrimagnetic fillers below their Curie temperature, in order to provide the core 80 with magnetic qualities. Ferromagnetic fillers may include transition metals such as iron (Fe), cobalt (Co), and nickel (Ni), rare earth metals such as those rare earth elements having atomic numbers (Z) from 64 to 69, alloys of ferromagnetic elements, and/or alloys of magnesium. For further example, ferromagnetic fillers may include Co ($T_{Curie}$ 1388 Kelvin (K)), Fe ($T_{Curie}$ 1043K), MnBi ($T_{Curie}$ 630K), Ni ($T_{Curie}$ 627K), $Fe_3O_4$ MnSb ($T_{Curie}$ 587K), Gadolinium (Gd) ($T_{Curie}$ 292K), $Nd_2Fe_{14}B$ ($T_{Curie}$ 583K), aluminum-nickel and cobalt alloys (ALNICO) ($T_{Curie}$ 537K-587K), and/or samarium-cobalt alloys ($T_{Curie}$ 993-1073K). Ferrimagnetic materials may include mixed oxides of iron and other elements such as, for example, strontium or ferrite. For further example, ferrimagnetic fillers may include iron (III) oxide $Fe_2O_3$ ($T_{Curie}$ 948K), iron (II, III) oxide $FeOFe_2O_3$ ($T_{Curie}$ 858K), $NiOFe_2O_3$ ($T_{Curie}$ 858k), $CuOFe_2O_3$ ($T_{Curie}$ 728K), $MgOFe_2O_3$ ($T_{Curie}$ 713K), $MnOFe_2O_3$ ($T_{Curie}$ 713K), Fe, Mn, and Zn alloys (ferrite), Ni, Fe, Mo alloys (molypermalloy powder), Si, Al, Fe alloys (Sendust), and/or $Y_3Fe_2(FeO_4)_3$ (yttrium iron garnet) ($T_{Curie}$ 560K). In various embodiments, a mixture of ferromagnetic/ferrimagnetic filler and a bisphenolic resin composition includes from 0 to 50 weight percent of the ferromagnetic/ferrimagnetic filler to the bisphenolic resin composition. In various embodiments, a mixture of ferromagnetic/ferrimagnetic filler and a bisphenolic resin composition includes between 1 and 50 weight percent of the ferromagnetic/ferrimagnetic filler, or between 5 and 45 weight percent of the ferromagnetic/ferrimagnetic filler, or between 10 and 40 weight percent of the ferromagnetic/ferrimagnetic filler, or between 20 and 30 weight percent of the ferromagnetic/ferrimagnetic filler. In various embodiments, the ferromagnetic/ferrimagnetic epoxy composition of the core 80 includes one or more conductivity modifiers as discussed above with respect to the conductive material. In various embodiments, the susceptor material may include one or more ferromagnetic and/or ferrimagnetic fillers.

In various embodiments, the non-conductive material (e.g., the insulating material of the at least one coil 88) may be a dielectric epoxy composition. The dielectric epoxy composition may be represented by a formula:

$$\text{wt \% A} + \text{wt \% B} + \text{wt \% C} + \text{wt \% D} + \text{wt \% E} + \text{wt \% } X_2Y_{4-6}O_{20}(OH, F)_4 \qquad [2]$$

In Formula 2, wt % indicates the corresponding quantity is a weight percent of the non-conductive filler relative to the bisphenolic resin composition; A is selected from at least one of: ($S_2O_2$) Silica microparticles, silica nanoparticles, silica flakes, or silica whiskers, ($Al_2O_3$) alumina microparticles, alumina nanoparticles, alumina flakes, or alumina whiskers; wt % A is a number in the range from 0 to about 50; B is selected from at least one of: ($SiO_4$) quartz microparticles, quartz nanoparticles, quartz flakes, or quartz whiskers; wt % B is a number in the range from 0 to about 50; B is selected from at least one of: ($TiO_2$) titania microparticles, titania nanoparticles, titania flakes, or titania whiskers; wt % C is a number in the range from 0 to about 50, D is selected from at least one of: (BN) boron nitride platelets, boron nitride flakes, boron nitride nanomesh, and agglomerations of boron nitride platelets, flakes, or nanomesh; wt % D is a number in the range from 0 to about 50; E is selected from at least one of: (AlN) aluminum nitride micro particles, nanoparticles, flakes, or platelets; wt % E is a number in the range from 0 to about 50; X is selected from at least one of: potassium, sodium, or calcium; Y is selected from at least one of: aluminum, magnesium, iron, manganese, chromium, titanium, or lithium; Z is selected from at least one of: silicon or aluminum; and wt % $X_2Y_{4-6}O_{20}(OH, F)_4$ is a number in the range from 0 to about 50. In various embodiments, the non-conductive filler may include a mixture of at least one of ($SiO_2$) silica microparticles, silica nanoparticles, silica flakes, or silica whiskers, ($Al_2O_3$) alumina microparticles, alumina nanoparticles, alumina flakes, or alumina whiskers, ($SiO_4$) quartz microparticles, quartz nanoparticles, quartz flakes, or quartz whiskers, titania microparticles, titania nanoparticles, titania flakes, or titania whiskers, (BN) boron nitride platelets, boron nitride flakes, boron nitride nanomesh, and agglomerations of boron nitride platelets, flakes, or nanomesh, (AlN) aluminum nitride microparticles, nanoparticles, flakes, or platelets, silica glass bubbles, glass micro fibers, or ground mica micro platelets or nano platelets. In various embodiments a mixture of the non-conductive filler relative to the bisphenolic resin composition includes between 0 and 50 weight percent of non-conductive filler, or between 1 and 50 weight percent of non-conductive filler, or between 5 and 45 weight percent of non-conductive filler, or between 10 and 40 weight percent of non-conductive filler, or between 20 and 30 weight percent of non-conductive filler.

In various embodiments, the liner segments 64 may include a material substantially similar to a material of one or both of the core 80 and the at least one coil 88. For example, the liner segments 64 may have an epoxy composition as described above. The liner segments 64 may be configured to react to the position of the fan blades 44 relative to the fan case 50, thereby minimizing air leakage around the tips 48 of the fan blades 44 and increasing efficiency of the gas turbine engine 10. The liner segments 64 may hang off of the fan case 50 by a thin plenum making the weight of the liner segments 64 important to the interface between the fan case 50 and the fan blades 44. For example, if the weight of the liner segments 64 is significant enough to cause axis-asymmetric gravity effects, the fan section 12 may exhibit axis-asymmetric behavior at low fan 40 speeds. Accordingly, by keeping the weight of the one or more magnets 60 close to the weight of the material removed from the liner segments 64 (e.g., the liner segment 64 material removed to form the cavity 68), axis-asymmetric behavior of the fan section 12 may be minimized or prevented. A similar thermal expansion coefficient of the one or more magnets 60 and the liner segments 64, as a result of material similarities, may substantially reduce or prevent cyclical fatigue between the one or more magnets 60 and the liner segments 64 and potential liberation of the one or more magnets 60 from the liner segments 64. Similar strength of the one or more magnets 60 and the liner segments 64 may reduce or prevent failure of the one or more magnets 60 and/or liner segments 64 at stress concentration points between the two components. Further, one or more magnets 60 having similar wear/hardness properties compared to the liner segment 64 material may reduce or avoid damage caused to the fan blades 44 as a result of an over-rub event.

Referring again to FIG. 2, in various embodiments, the anti-ice system 58 may include a power supply 92. In various embodiments, the power supply 92 may include a battery, a capacitor, a generator, etc. In various embodiments, the power supply 92 may include an existing power supply for the gas turbine engine 10. The power supply 92 may be configured to condition an electrical power signal suitable for the one or more magnets 60. For example, the power supply 92 may be configured to provide an AC current to the one or more magnets 60 at varying magnitudes of current and frequency, for example, to control the magnetic field strength and, hence, the amount of inductive heating applied to the fan blades 44.

In various embodiments, the anti-ice system 58 may include a controller 94 configured to permit an operator to control operation of the anti-ice system 58. The controller 94 may be in communication (e.g., signal communication) with one or more of the power supply 92, one or more sensors 96, and an input/output device 98. The controller 94 may selectively command the electrical current supplied to the at least one magnet 60 via the power supply 92 in response to an input received by the controller, for example, from the one or more sensors 96 or an operator input via the input/output device 98. The controller 94 may include any type of computing device, computational circuit, or any type of process or processing circuit capable of executing a series of instructions that are stored in memory. The controller 94 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling one or more components of the anti-ice system 58, and the stored instructions are not limited to any particular form (e.g., program files, system data, buffers, drivers, utilities, system programs, etc.) provided they can be executed by the controller 94. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 94 may be achieved via the use of hardware, software, firmware, or any combination thereof. The controller 94 may also include input (e.g., a keyboard, a touch screen, etc.) and output devices (a monitor, sensor readouts, data ports, etc.), such as input/output device 98, that enable the operator to input instructions, receive data, etc. The one or more sensors 96 may include temperature sensors, humidity sensors, etc. for determining whether ice formation on the fan blades 44 is likely.

Systems and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments. Accordingly, the present disclosure is not to be restricted except in light of the attached claims and their equivalents.

What is claimed is:

1. A magnet assembly for an anti-ice system, the magnet assembly comprising:
   an abradable liner segment extending between an inner radial surface of the abradable liner segment and an outer radial surface of the abradable liner segment, the abradable liner segment comprising a liner material, the liner material having a liner epoxy composition, the liner epoxy composition comprising a liner bisphenolic resin composition, the abradable liner segment forming a cavity within the abradable liner segment, the cavity extending through the abradable liner segment from the inner radial surface toward the outer radial surface; and
   a magnet mounted to the abradable liner segment and disposed within the cavity, the magnet comprising:
      a core comprising a first material, the first material having a first epoxy composition; and
      at least one coil wound about a perimeter of the core, the at least one coil comprising a second material, the second material having a second epoxy composition;
      wherein each of the first epoxy composition and the second epoxy composition comprise a bisphenolic resin composition and at least one of a filler or a conductivity modifier, the bisphenolic resin composition comprising bisphenol AF.

2. The magnet assembly of claim 1, wherein the first epoxy composition is a ferromagnetic epoxy composition.

3. The magnet assembly of claim 1, wherein the second epoxy composition is a conductive epoxy composition.

4. The magnet assembly of claim 1, wherein the at least one coil includes at least a first coil and a second coil, the first coil and the second coil alternatingly wound about the perimeter of the core.

5. The magnet assembly of claim 1, wherein the perimeter of the core extends between a first core end and a second core end and the at least one coil is wound about the perimeter of the core from the first core end to the second core end.

6. The magnet assembly of claim 1, wherein the magnet is configured to emit a magnetic field in response to an electrical current applied to the at least one coil.

7. The magnet assembly of claim 2, wherein the first epoxy composition includes the at least one filler, the at least one filler including an iron filler.

8. An anti-ice system, comprising:
a susceptor material; and
a magnet assembly comprising:
- an abradable liner segment extending between an inner radial surface of the abradable liner segment and an outer radial surface of the abradable liner segment, the abradable liner segment comprising a liner material, the liner material having a liner epoxy composition, the liner epoxy composition comprising a liner bisphenolic resin composition, the abradable liner segment forming a cavity within the abradable liner segment, the cavity extending through the abradable liner segment from the inner radial surface toward the outer radial surace; and
- a magnet mounted to the abradable liner segment and disposed within the cavity, the magnet having a magnetic field encompassing at least a portion of the susceptor material, the magnet comprising:
  - a core comprising a first material, the first material having a first epoxy composition; and
  - at least one coil wound about a perimeter of the core, the at least one coil comprising a second material, the second material having a second epoxy composition; and
  - wherein each of the first epoxy composition and the second epoxy composition comprise a bisphenolic resin composition and at least one of a filler or a conductivity modifier, the bisphenolic resin composition comprising bisphenol AF.

9. The anti-ice system of claim 8, wherein the magnet is configured for inducing eddy currents in the susceptor material to increase a surface temperature of the susceptor material.

10. The anti-ice system of claim 8, wherein the susceptor material is configured to rotate about an axis and wherein the magnet is stationary with respect to the axis.

11. The anti-ice system of claim 10, wherein the susceptor material is radially disposed between the magnet and the axis.

12. A fan assembly for a gas turbine engine, the fan assembly comprising:
- a fan case annularly disposed about an axial centerline, the fan case including an interior surface facing the axial centerline;
- a fan radially disposed within the fan case, the fan comprising a plurality of fan blades extending radially from a shaft configured to rotate about the axial centerline;
- a plurality of abradable liner segments mounted to the interior surface of the fan case radially outward of the fan, each abradable liner segment of the plurality of abradable liner segments including an inner radial liner surface; and
- a first magnet mounted within a first abradable liner segment of the plurality of abradable liner segments, the first magnet including an inner radial magnet surface, the inner radial magnet surface disposed at the inner radial liner surface with the inner radial liner surface and the inner radial magnet surface facing the fan, the first magnet positioned within the fan case radially outward of the fan, the first magnet configured for inducing eddy currents in the plurality of fan blades to increase a surface temperature of the plurality of fan blades, the first magnet comprising:
  - a core comprising a first material, the first material having a first epoxy composition; and
  - at least one coil wound about a perimeter of the core, the at least one coil comprising a second material, the second material having a second epoxy composition;
  - wherein each of the first epoxy composition and the second epoxy composition comprise a bisphenolic resin composition and at least one of a filler or a conductivity modifier, the bisphenolic resin composition comprising bisphenol AF.

13. The fan assembly of claim 12, wherein the plurality of abradable liner segments is mounted to the interior surface of the fan case about a circumference of the interior surface.

14. The fan assembly of claim 12, wherein the first magnet is configured to emit a magnetic field in response to an electrical current applied to the at least one coil.

15. The fan assembly of claim 14, further comprising:
- a power supply in communication with the first magnet; and
- a controller in communication with the power supply, wherein the controller selectively commands the electrical current supplied to the first magnet via the power supply in response to an input received by the controller.

16. The fan assembly of claim 12, further comprising a second magnet, and the first magnet and the second magnet are axially spaced from one another within the fan case.

17. The fan assembly of claim 12, further comprising a second magnet, and the first magnet and the second magnet are circumferentially spaced from one another within the fan case.

18. The fan assembly of claim 12, wherein the first epoxy composition is a ferromagnetic epoxy composition and wherein the second epoxy composition is a conductive epoxy composition.

* * * * *